United States Patent
Mukai

Patent Number: 5,851,262
Date of Patent: Dec. 22, 1998

[54] METHOD OF REFINING MOLTEN METAL

[75] Inventor: Takashi Mukai, Yonago, Japan

[73] Assignee: Hitachi Metals, Ltd., Tokyo, Japan

[21] Appl. No.: 682,597

[22] PCT Filed: Dec. 28, 1994

[86] PCT No.: PCT/JP94/02298

§ 371 Date: Jul. 24, 1996

§ 102(e) Date: Jul. 24, 1996

[87] PCT Pub. No.: WO96/17093

PCT Pub. Date: Jun. 6, 1996

[30] Foreign Application Priority Data

Nov. 25, 1994 [JP] Japan .................................. 6-291148
Nov. 25, 1994 [JP] Japan .................................. 6-291151
Nov. 25, 1994 [JP] Japan .................................. 6-291152
Nov. 28, 1994 [JP] Japan .................................. 6-292519

[51] Int. Cl.⁶ .................................................... C21C 7/00
[52] U.S. Cl. ........................... 75/10.22; 75/10.1; 75/309; 75/306; 75/303; 75/319
[58] Field of Search ............................. 75/10.22, 10.1, 75/309, 306, 303, 319

[56] References Cited

U.S. PATENT DOCUMENTS 4,484,946 11/1984 Ototani ........................................ 75/58
4,584,015 4/1986 Hartwig et al. ............................. 75/10
5,160,531 11/1992 Koizumi .................................. 75/10.15

FOREIGN PATENT DOCUMENTS 2128489 of 1971 France.
55-48084 12/1980 Japan.
58-157945 of 1982 Japan.
60082610 of 1982 Japan.
58-087234 5/1983 Japan.
55-48084 12/1983 Japan.
58-221220 12/1983 Japan.

Primary Examiner—Patrick Ryan
Assistant Examiner—M. Alexandra Elve
Attorney, Agent, or Firm—Finnegan, Henderson, Farabow, Garrett & Dunner

[57] ABSTRACT

A molten metal is subjected to a refining under a reduced pressure of vacuum or a low oxygen partial pressure atmosphere, and subsequently heated by means of inert gas plasma to re-refine. The metals to be processed are stainless steels, Ni-base alloys, Fe—Ni system alloys, electromagnetic steels, medium carbon structural steels having low nitrogen and low sulfur, and high carbon alloy tool-steels whose carbon, oxygen and/or sulfur content is strictly limited. In re-refining, any one of CaO and $CaF_2$, CaO and $Al_2O_3$, and CaO, $CaF_2$ and $Al_2O_3$ is used. For example, an Fe—Ni system alloy having 0.01% carbon and sulfur 0.005% can be produced.

15 Claims, 8 Drawing Sheets

METHOD OF REFINING MOLTEN METAL

TECHNICAL FIELD

The present invention relates to a method of refining molten metal wherein the molten metal is refined in a vacuum or a low oxygen partial pressure atmosphere and subsequently further refined at a pressure about the atmospheric pressure.

BACKGROUND ART

A method of refining a molten metal in a vacuum or a low oxygen partial pressure atmosphere (herein referred to as "RPR": Reduced Pressure Refining) have been widely used due to their capability of allowing highly pure steel to be easily obtained. A vacuum induction furnace (referred to as "VIF") is utilized for such methods.

In the refining process under a reduced pressure, refining proceeds in such a way that some kinds of impurity turn into a compound of themselves or their oxides and are separated from the molten metal through vaporization, splattering or floating. In this case, as refining proceeds, an amount level of impurities in the molten metal becomes very low (the term "impurities" herein refers generally to materials that are sources of impure elements or nonmetallic inclusions).

In refining under a reduced pressure, vaporized or splattered components partially condenses to stick as scum on the free board zone of the wall of a refining furnace. Other drossy impurities that do not vaporize are separated and float on the surface of the molten metal. When the furnace is tilted to discharge the molten metal, the molten metal flow washes away a part of these adhesions and floating substances, which returns to the melt. Furthermore, if the lining refractory or liner of a ladle or tundish that receives the molten metal is not sufficiently heated before receiving the molten metal, there is a possibility that the molten metal is contaminated by active gaseous components adsorbed in the liner. The liner partially reacts with the molten metal activated by refining under a reduced pressure, or is eroded by the molten metal. The molten metal may be contaminated by the active gases or erosion products.

In order to prevent such adherents and floating substances, there have been proposed some ways which are a method of discharging molten metal from the bottom of a refining vessel and leaving a part of the molten metal in the vessel to prevent floating impurities to again mix into the molten metal, a method of without contact with the molten metal with utilization of an induction scull furnace. After discharging molten metal from the vessel, there has been proposed a method of removing substances, which can become to fine nonmetallic inclusions, with utilization of a ceramic filter. Some of those methods have been put into practice, but they are not yet usual due to various constraints. In addition, since the methods are not effective for all the re-entered substances or contaminants, they must be combined to have an effect on each re-entered substance listed above. However, costs increase with increasing number of combinations.

It is conceived that re-entered substances can be removed by, after vacuum refining, re-refining by a ladle refining furnace of a graphite electrode arc heating method or by ASEA-SKF furnace. However, since those methods use graphite electrodes that are dipped into slag on the surface of molten steel, there is a problem that carbon enters into the molten metal. JP-A-4-318118 proposes a producing method of an ultra-low-carbon/sulfur steel by decarburizing melt by vacuum degassing processing, then plasma-heating the melt containing not less than 0.2 wt % of solute aluminum, and stirring the melt under the presence of slag a basicity of 8 or more to desulfurize it.

According to the method of the JP-A-4-318118, there is a problem that solute aluminum must be increased and also the basicity of slag must be increased to 8 or more during plasma-refining because the slag generated before the plasma-refining is introduced into a plasma-refining furnace.

That is, since the method introduces a large amount of slag into a plasma-refining furnace, large amounts of deoxidizers and reducing agents are required to improve the slag, resulting in a decrease in refining effects.

Containing of nitrogen oxygen, and carbon elements is strictly limited in many products such as Ni base superalloys or electric and magnetic materials of, for example, Fe—Ni alloys because properties of such products are extremely degraded if such elements enter into such alloys as impurities elements.

To reduce nitrogen or oxygen content, for example, vacuum melting or reflux vacuum refining is used. To reduce carbon content, an oxygen source is added or blown into molten metal to react with carbon in the melt to generate CO or $CO_2$ gas to be discharged out of the melt.

Some of high-carbon high-alloy tool steels containing a large amount of carbides has a problem that coarse MC type carbides are liable to crystallize during solidification of the steels. In order to solve the problem, it has been known to reduce nitrogen in molten steel to narrow a range between liquidus and solidus to disperse carbides as fine particles.

Both of carbon and sulfur are strictly limited in some alloy products referred to as electric and magnetic materials such as Fe—Ni alloys because these elements may degrade required properties of such products.

Much of the carbon and sulfur is mixed into molten metal when a cold material is melted. In order to remove to obtain a low sulfur metal, it is required to add a flux mainly comprising CaO to efficiently carry out desulfurization refining.

On the other hand, one known decarburizing method is to react carbon with oxygen to burn them, and is more efficient when combined with a reduced-pressure or a vacuum atmosphere. In any case, however, reaction products are oxides and are very likely to stick to the surface of a molten metal or wall of a refining furnace and mix into molten metal depending on the behavior of the molten metal, thereby contaminating the refined metal.

Desulfurization may be performed in the presence of slag generated in the preceding process depending on the refining method in the preceding process or handling of a molten metal during transferring. Many efforts are thus required to improve such slag, preventing efficient desulfurization.

However, if decarburization and desulfurization is avoided, a high grade material of low carbon or low sulfur must be selected as a material to be charged into a refining furnace, thereby substantially increasing the cost of a material to be melted and making the method unsuitable for economical mass production.

SUMMARY OF THE INVENTION

It is an object of the invention to provide a refining method for a molten metal to carry out effective refining using a new flux having a specific composition without a need to improve slag from the preceding processing a refining furnace and without carbon mixing or entering.

It is another object of the invention to provide a refining method for a molten metal to carry out effective refining using a new flux without a need to improve slag from the preceding process in a refining furnace, the metal being typically required to have strictly limited amount of nitrogen as described above.

It is still another object of the invention to provide a refining method for a molten metal that does not involve carbon mixing or entering described above or require the improvement of slag but can flexibly carry out a high-level refining in refining stainless steel, Ni-base alloys, or Fe—Ni alloys for which the content of carbon is strictly limited or the above steel or alloys for which the content of sulfur is strictly limited, or structural medium carbon steel and high carbon alloy tool steel, or steel and alloys for which the contents of both carbon and sulfur are strictly limited.

It is still another object of the invention to provide a refining method for an Fe—Ni alloy which avoids carbon mixing described above, or does not require the improvement of slag from the preceding process but can flexibly carry out a high-level refining in refining steel or alloys for products referred to as electric and magnetic materials such as Fe—Ni alloys containing at least 30 to 50 wt. % of Ni for which the contents of both carbon and sulfur are strictly limited.

According to the present invention where refining a molten metal in vacuum or a low oxygen partial pressure atmosphere (namely, "RPR") is carried out with utilization of a vessel with a heating means, a highly effective refining can be achieved since there is no carrying slag from the "RPR" process into a re-refining process with regard to the molten metal.

As described above, in the "RPR", there are impurities that remain in molten metal instead of floating in addition to impurities sticking as scum to the free board zone on the wall of a refining furnace or drossy impurities floating on the surface of metal melt in the refining furnace. The impurities primarily comprise $SiO_2$ generated by erosion of the wall of the refining furnace.

According to the invention, there is no necessity of improving slag during re-refining by plasma-heating since no slag is carried from the preceding process to the re-refining process. Thus, it is not necessary to add a large amount of CaO or $SiO_2$ to adjust the basicity to 8 or more, and allows efficient removal of impurities enter into molten metal during "RPR" to proceed to higher-level refining.

The inventor found that impurities can be improved and high-level refining can be carried out by using a relatively small amount of $SiO_2$ generated during "RPR" and enter into molten metal as a part of impurities, adding a new flux comprising a compound composition including CaO as an essential component, and adjusting the basicity without adding $SiO_2$ in principle.

The inventor found also that a steel with a very low level nitrogen can be obtained when a vessel having a heating means is used to carry out the refining under vacuum or a low oxygen and nitrogen partial pressure atmosphere to denitrify the molten metal to a predetermined level of nitrogen, subsequent re-refining under plasma-heating is then initiated with substantially no slag from the preceding process but with a new flux addition.

According to another refining method of the invention decarburization is carried out by supplying an oxygen source to molten metal before the "RPR" to reduce carbon for stainless steels, Ni-base alloys, and Fe—Ni alloys in which entering of carbon is strictly limited. This is a manner of a first refining in accordance with the present invention.

The molten metal that the carbon content has been adjusted or decarburization refining has been performed to achieve a low carbon level is subsequently moved via a ladle into another vessel to be deoxidized, or retained in the same vessel, where the content of carbon is adjusted or decarburization refining is carried out to achieve a low carbon level in the same vessel. The molten metal is then subjected to the "RPR" to complete deoxidization.

According to one aspect of the invention, desulfurization or other refining can be cheaply and efficiently performed by using the above first refining and the "RPR" for decarburization to enable the use of as clean molten metal as possible during subsequent re-refining under plasma-heating.

According to another aspect, there is provided a combined refining method wherein molten metal of an Fe—Ni alloy containing at least 30 to 50 wt. % of Ni is deoxidized and decarburized in a vessel having a heating means in a vacuum or a low oxygen partial pressure atmosphere and subsequently refined in another vessel or the same vessel using gas plasma. Thus, the contents of this method considerably different from those of conventional methods.

In the invention, molten metal for which decarburization refining is performed to achieve a low carbon level is moved via a ladle into another vessel such as an arc furnace or a converter, or retained in the same vessel, where the molten metal is decarburized to a low carbon level. The metal melt is then subjected to the refining under a reduced pressure to complete deoxidization.

According to a feature of the present invention, an Fe—Ni alloy, which contains 30 to 50% of Ni and which is desired to be low carbon, is subjected to "RPR" with utilization by a container having a heating means to fully decarburize, subsequently the re-refining is carried out substantially without slag but adding a fresh flux to fully reduce remaining impurities from the "RPR" to achieve a remarkably low level of impurities.

DETAILED DESCRIPTION OF THE INVENTION

Figure 1:
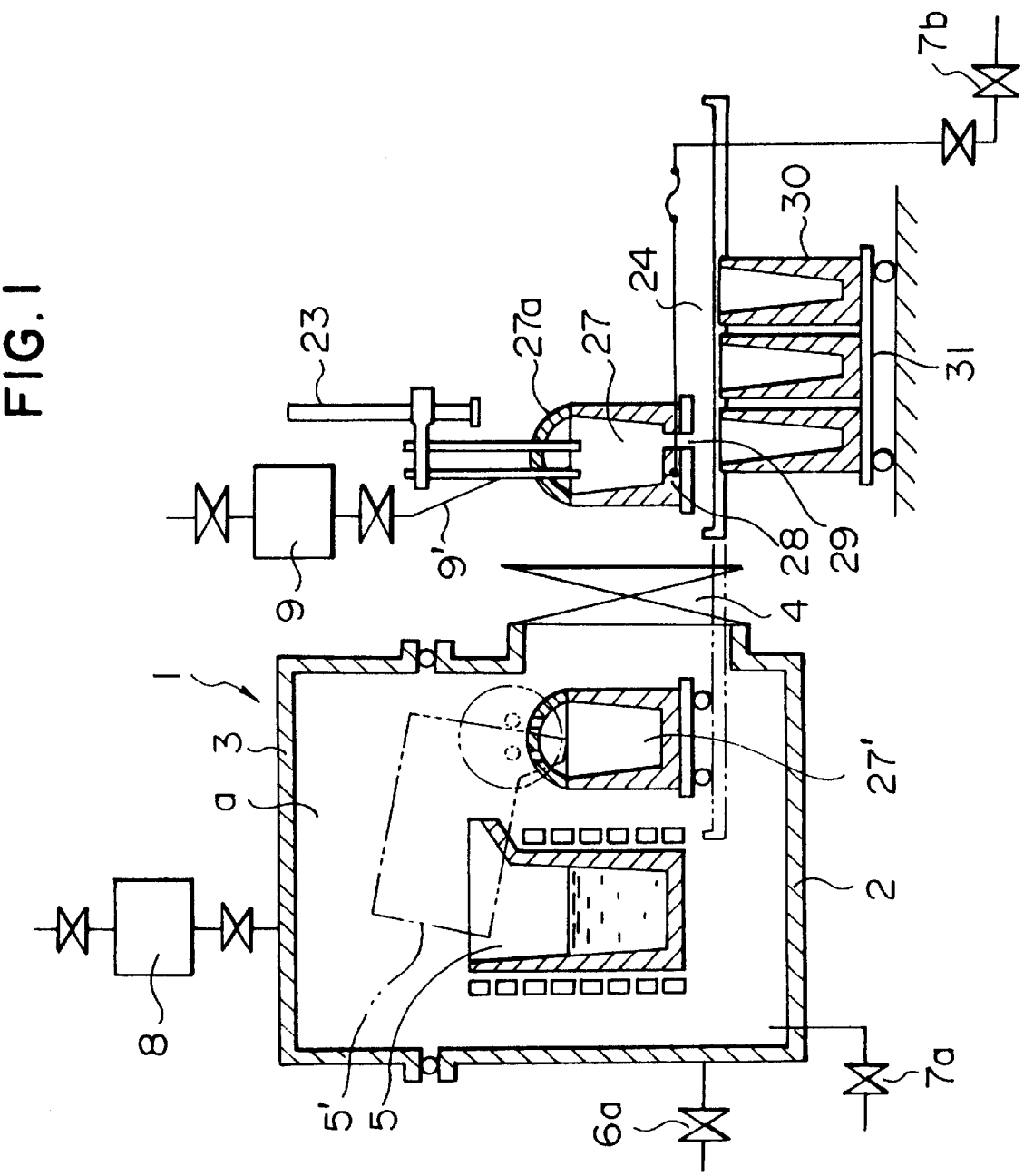
FIG. 1 shows an apparatus as one embodiment of the invention.

According to a first feature of the present invention, a molten metal is subjected to the "RPR" in a vessel having a heating means, and with a fresh flux mainly comprising any combination of CaO and $CaF_2$, CaO and $Al_2O_3$, or CaO, $CaF_2$ and $Al_2O_3$ is added into the molten metal substantially without slag, and it is re-refined by heating by means of inert gas plasma.

According to a second feature of the present invention, a molten metal is subjected to the "RPR" in a vessel having a heating means, and the refined molten metal substantially without slag is transferred to another vessel to which a fresh flux mainly comprising any combination of CaO and $CaF_2$, CaO and $Al_2O_3$, or CaO, $CaF_2$ and $Al_2O_3$ and in which the refined molten metal is re-refined by heating by means of inert gas plasma.

According to a third feature of the present invention, a molten metal is subjected to the "RPR" in a vessel having a heating means to adjust the content of nitrogen to 0.01% or less, and a fresh flux is added to the refined molten metal substantially without slag to re-refine the molten metal by heating by means of inert gas plasma.

According to a fourth feature of the present invention, a molten metal is subjected to the "RPR" in a vessel having a heating means to adjust the content of nitrogen to 0.01% or less, and the refined molten metal substantially without slag is transferred to another vessel to which a fresh flux is added and in which the refined molten metal is re-refined by heating by means of inert gas plasma.

In the case of a material of stainless steel, Ni base alloys and Fe—Ni alloys, into which carbon is strictly restricted to mix, it is preferably subjected to a first refining where the molten metal is decarburized to a low carbon level by supplying an oxygen source. The refined molten metal with an adjusted content of carbon or a low level carbon is optionally transferred to another vessel through a ladle and is subjected to the "RPR" to complete deoxidization. Alternatively, the molten metal processed by the first refining to adjust a carbon content or decarburize to a low carbon level is subjected to the "RPR" to complete deoxidization in the same vessel without transferring the molten metal after the first refining.

According to another aspect, the inventor found that desulfurization and other re-refining processes can be carried out efficiently and economically by subjecting the molten metal as clean as possible to re-refining under plasma-heating after the first refining and the "RPR" as described above.

Thus, according to a fifth feature of the present invention, an oxygen source or a mixture of an oxygen source and inert gas is added to or blown into a molten metal to adjust the content of carbon to 0.01% or less, and thereafter the molten metal is poured into a vessel having a heating means. The molten metal is next subjected to the "RPR", thereafter a fresh flux is added into the molten metal to re-refine by heating by means of inert gas plasma to achieve a carbon content of 0.01% or less.

According to a sixth feature of the present invention, an oxygen source or a mixture of an oxygen source and an inert gas is added to or blown into a molten metal to adjust the content of carbon to 0.01% or less, and thereafter the molten metal is poured into a vessel having a heating means. The molten metal is next subjected to the "RPR", and thereafter transferred into another vessel. A fresh flux is added into the transferred molten metal to re-refine by heating by means of inert gas plasma to achieve a carbon content of 0.01% or less.

According to a seventh feature of the present invention, an oxygen source or a mixture of an oxygen source and an inert gas is added to or blown into a molten metal in a vessel having a heating means to adjust the carbon content to 0.01% or less, and thereafter the molten metal is subjected to the "RPR". A fresh flux is added into the refined molten metal to re-refine by heating by means of inert gas plasma to achieve a carbon content of 0.01% or less.

According to an eighth feature of the present invention, an oxygen source or a mixture of an oxygen source and an inert gas is added to or blown into a molten metal in a vessel having a heating means to adjust the carbon content to 0.01% or less, and thereafter the molten metal is subjected to the "RPR", and thereafter transferred into another vessel. A fresh flux is added into the refined molten metal to re-refine by heating by means of inert gas plasma to achieve a carbon content of 0.01% or less.

According to a ninth feature of the present invention, a flux mainly comprising any combination of CaO and $CaF_2$, CaO and $Al_2O_3$, or CaO, $CaF_2$ and $Al_2O_3$, is added into a molten metal in a vessel having a heating means, which is already subjected to the "RPR" to re-refine by heating by means of inert gas plasma to achieve a sulfur content of 0.005% or less.

According to a tenth feature of the present invention, a molten metal in a vessel having a heating means is transferred into another vessel and thereafter a flux mainly comprising any combination of CaO and $CaF_2$, which is already subjected to the "RPR", CaO and $Al_2O_3$, or CaO, $CaF_2$ and $Al_2O_3$ is added into the transferred molten metal to re-refine by heating by means of inert gas plasma to achieve a sulfur content of 0.005% or less.

The present invention can be applied to various kinds of molten metal irrespective of those chemical composition and is particularly effective when applied to an Fe—Ni system alloy comprising 30 to 50% Ni.

Thus, according to an eleventh feature of the present invention, a molten metal of an Fe—Ni alloy comprising at least 30 to 50 wt. % Ni is poured into a container having a heating means, where the molten metal is subjected to the "RPR" to adjust the carbon content to 0.01% or less, and thereafter a flux mainly comprising any combination of CaO and $CaF_2$, CaO and $Al_2O_3$, or CaO, $CaF_2$ and $Al_2O_3$ is added into the refined molten metal to re-refine by heating by means of inert gas plasma to achieve a carbon content of 0.01% or less and a sulfur content of 0.005% or less.

According to a twelfth feature of the present invention, a molten metal of an Fe—Ni alloy comprising at least 30 to 50% Ni is poured into a container having a heating means, where the molten metal is subjected to the "RPR" to adjust the carbon content 0.01% or less, and thereafter the refined molten metal is transferred into another vessel substantially without carrying slag, a flux mainly comprising any combination of CaO and $CaF_2$, CaO and $Al_2O_3$, or CaO, $CaF_2$ and $Al_2O_3$ is added into the refined molten metal to re-refine by heating by means of inert gas plasma to achieve a carbon content of 0.01% or less and a sulfur content of 0.005% or less.

According to both of the eleventh and the twelfth features, the Fe—Ni alloy is melted before the "RPR", and preferably the first refining defined hereinbefore is carried out before the above "RPR". The difference between the eleventh and the twelfth features is that in the eleventh feature, the "RPR" and the plasma re-refining are carried out in the same vessel, whereas in the twelfth feature, the both type of refining mentioned above are carried out in different vessels, respectively, namely the molten-metal is transferred from the first vessel for the preceding process into the second vessel for the following process.

According to a thirteenth feature of the present invention, a cold material of an Fe—Ni system alloy comprising at least 30 to 50% of Ni is melt in a vessel having a heating means and subjected to the "RPR" to have a carbon content of 0.01% or less. A flux mainly comprising any combination of CaO and $CaF_2$, CaO and $Al_2O_3$, or CaO, $CaF_2$ and $Al_2O_3$ is added into the refined molten metal to re-refine by heating by means of inert gas plasma to achieve a carbon content of 0.01% or less and a sulfur content of 0.005% or less.

According to a fourteenth feature of the present invention, a solid raw material of an Fe—Ni system alloy comprising at least 30 to 50% of Ni is melt in a vessel having a heating means and subjected to the "RPR" to have a carbon content of 0.01% or less, and thereafter the refined molten-metal is transferred into another vessel, where a flux mainly comprising any combination of CaO and $CaF_2$, CaO and $Al_2O_3$, or CaO, $CaF_2$ and $Al_2O_3$ is added into the molten metal to re-refine by heating by means of inert gas plasma to achieve a carbon content of 0.01% or less and a sulfur content of 0.005% or less.

It should be noted that, according to the above features of from the eleventh to the fourteenth, the content of carbon in a molten Fe—Ni alloy comprising 30 to 50% of Ni is reduced to 0.01% or less until just before beginning of plasma refining in which the molten metal is refined to primarily remove impurities such as scum and desulfurize while restraining the variance of carbon content of the molten metal.

The invention is thus characterized in that an Fe—Ni alloy is pre-refined under specific conditions and subsequently refined by gas plasma using specific flux that is newly added.

The vacuum or the low oxygen partial pressure atmosphere herein means an atmosphere of lower than the atmospheric pressure or an oxygen partial pressure atmosphere of the oxygen partial pressure of the atmosphere, that is, lower than 213 HPa (1013 Hpa×0.21). Methods capable of meeting these conditions include drawing gas to reduce pressure by means of a vacuum pump, and substituting a part of oxygen with inert gas (Ar or He) under a combination of drawing gas to reduce pressure and the gas substitution to obtain an inert gas atmosphere of several hundreds Torr or lower.

While there are a vacuum induction furnace (VIF), and a VOD furnace as a practical furnace suitable for such pressure reducing operations it is desirable to use a furnace of induction heating which does not substantially require flux during the refining under a reduced pressure in order to omit a slag removing operation before re-refining after the re-preceding refining.

Referring to the term of "the molten metal substantially without slag just after the "RPR" and re-refining under plasma-heating" it also means that the re-refining is carried out after removing slag from the molten metal by any means even if a flux is added to the molten metal during the "RPR" with utilization of VOD, for example.

In the present invention, there is a case where a molten metal is subjected to the "RPR" in a vacuum induction melting furnace and subsequently a flux is added into the refined molten metal just before finishing of the above refining or just after the above refining followed by pouring the molten metal into a re-refining vessel. This is intended to immediately start to re-refine the molten metal after the "RPR". Thus, such case is also included in the present invention.

According to a desirable manner of the refining process of the invention, the molten metal is stirred during refining. In the view point of stirring effect, such stirring is preferably carried out by blowing inert gas into the molten metal through a porous plug attached to the bottom wall of the vessel containing the molten metal. It is also effective to blow a powder flux of a material as stated herebefore into the molten metal together with inert gas in order to trap inclusions by means of the flux. An electromagnetic stirring apparatus may be utilized solely or together with the gas blowing operation.

Since the "RPR" of the invention is carried out in a vessel having a heating means, the use of such a heating means as required prevents the temperature of molten metal from decreasing to enable the molten metal to be flexibly refined at a predetermined level, thereby allowing various materials and required refining levels as well as a relatively small amount of molten metal to be dealt with. Although the use of an arc furnace as a melting and refining furnace before the "RPR" allows efficient melting and refining, it is of course possible to start with melting from cold materials in a furnace of the "RPR".

In the invention method, the selection of refractories is important to improve refining effects in a refining furnace and to reduce reaction products from refractories in a furnace of the "RPR". Refractories containing a large amount of $SiO_2$ are inappropriate under a reduced pressure, while high alumina or magnesite basic bricks or magnesite-chrome direct void bricks burned at very high temperatures can be effectively used. Temperature retention for refractories until the initiation of the "RPR" is also important. These considerations are required to reduce the amount of scum and to make a flux containing CaO required for re-refining effective.

According to the second aspect of the invention, refining is executed in a fresh container differing from that used for the "RPR", thus the molten metal is scarcely contaminated by slag with addition of flux so that the molten metal is easily and efficiently refined at a high level.

The re-refining in the invention is carried out without slag from the preceding process such that non-vaporizable impurities and scummy impurities are effectively trapped by newly added fresh flux activated by heating by means of inert gas plasma. That is, in the invention, the flux can be heated by inert gas plasma-heating so as to have low viscosity and to be active, thereby effectively capturing contaminants such as adherents and floating substances described above, nonmetal inclusions, and contaminants generated by refractories. It is desirable that the flux be sufficiently stirred by inert gas blowing as described below to sufficiently contact the molten metal and react with it to produce high refining effects.

The flux used in re-refining must contain CaO with high deoxidization and desulfurization effects and is mainly added with $CaF_2$ with a low melting point for increasing flowability and refining effects and $Al_2O_3$ for improving deoxidization and desulfurization effects, both of which are used as occasion demands.

In this case, although $SiO_2$ for adjusting basicity is not added, the basicity is adjusted to 2 or more using $SiO_2$ mixed as impurities during "RPR" and newly added CaO described above. The desirable basicity is 3 to 7.

Fluxes are poured into a molten metal together, but can be added to molten metal by blowing them from the bottom of a vessel using, for example, an Ar gas described above.

In an experiment wherein 37% CaO–63% $CaF_2$ that is a flux in accordance with the invention is added from the top as a combined flux and stirred using Ar, the deoxidization rate greatly increased due to the stirring effects of the blowing, the concentration of oxygen decreased to 10 to 12 ppm in the case of a stainless steel (JIS SUS304), and it was also confirmed that sulfur can be decreased from 0.02% to not more than 0.01%.

The invention is also characterized in that no slag used for refining in a furnace of the "RPR" is substantially introduced into a re-refining process. Although the term "mainly" used with regard to the flux newly added means that the flux in accordance with the present invention occupies most, that is, 95% or more of the overall flux used, a very small amount of $SiO_2$ may be added to adjust the basicity. However, $SiO_2$ need not be added in the invention process because it is introduced as an impurity from a vessel of the "RPR".

Stirring is desirably added to re-refining by plasma-heating that is the final refining process of the invention. To stir molten metal, inert gas is desirably introduced from a porous plug mounted on the bottom wall of a furnace to produce good effects. An electromagnetic stirrer can also be used solely or with inert gas.

Since an inert gas plasma-heating device does not generate an oxide gas such as $CO_2$, $H_2O$, or free $O_2$ and is suitable for heating at very high temperatures as in a burner as described above, it cannot only be used for re-refining in the invention but also to preheat a second re-refining vessel during the "RPR" so that the vessel will be very clean and hot.

In addition, a sliding nozzle method with a nozzle installed at the bottom of a vessel is more appropriate for pouring melt from a re-refining vessel into another vessel than a tilt pouring method or a stopper method because the former method does not involve the mixing of slag or damage to the stopper during plasma-heating.

According to the third and fourth features of the invention, the invention process is suitable for refining of fully low nitrogen and low carbon Ni-base super alloys, electric and magnetic alloys, e.g. Fe—Ni alloys and high carbon and high alloy tool steels selected from low nitrogen steels containing carbon or low nitrogen alloys containing carbon, in which the "RPR" is carried out by releasing oxygen and nitrogen remaining in the molten metal into the ambient environment of vacuum or a low oxygen and nitrogen partial pressure. In this case, if the carbon level is low, a gas mainly comprising an oxygen gas that is an example of oxygen source is desirably blown into the molten metal to react the oxygen with the carbon in the molten metal to generate a CO gas, which is then discharged out of the vessel, while if the carbon level is high, the content of carbon is desirably adjusted when "RPR" is finished. As a result, the molten metal containing a relatively small amount of slag, a small or predetermined amount of carbon, and remaining low-level oxygen and nitrogen can be effectively refined during subsequent re-refining under plasma-heating that is an important process, using only a few types and a small amount of fluxes to be newly added.

With regard to advantages in the "RPR" and subsequent re-refining, according to the present invention, a relatively clean molten metal with reduced oxygen and nitrogen and substantially without slag is subjected to the plasma re-refining after the "RPR".

This enables the re-refining under plasma-heating that is an important process of the invention to be dedicated to removal of impurities such as scum and dross which is otherwise performed during "RPR", and saves the types and amount of fluxes used under plasma-heating. According to this advantage, in the case of steel and alloys containing carbon and nitrogen, which is required to denitrify, an oxygen source is previously supplied to the molten metal to promote decarburization thereby improving denitrification effect, and thereafter a carbon source is added to adjust the carbon content just after the following process of the "RPR" is finished.

Although the gas blowing optionally performed before or during the "RPR" is a desirable decarburization method, more of the carbon in the molten metal may be removed by combining the gas blowing with addition of an oxide comprising the main or subsidiary component of the molten metal (for example, a nickel oxide can be used for an Fe—Ni alloy) for oxidizing the carbon in the molten metal. This is desirable because primary decarburization reaction is carried out in advance by the blowing of a gas mainly comprising oxygen, and only a small amount of oxide need be added. With this method, a small amount of slag is generated when an oxide is added and slag is decomposed and discharged out of a container as a gas by the subsequent "RPR".

Further, the decarburization refining by the blowing of a gas mainly comprising an oxygen gas during the "RPR" in accordance with the invention can simultaneously promote denitrification in a balanced reaction.

The re-refining in accordance with the invention newly adds activated fluxes under inert gas plasma-heating to effectively absorb impurities and nonmetal inclusions separated during the "RPR". That is, in the invention, since it is unnecessary to add an excessive new flux for improving slag due to the substantial absence of slag from the "RPR", the basicity of slag need only be moderately increased and only a small amount of flux may be added. In the third and fourth features of the invention, the basicity of a compound flux mainly comprising CaO may be 2 or more. It is desirably adjusted to 3 to 7. As a result, the flux can be sufficiently heated by inert gas plasma-heating so as to have low viscosity and to be active, thereby effectively capturing contaminants such as adhesions and floating substances described above, nonmetallic inclusions, and contaminants generated by refractories. It is desirable that the flux be sufficiently stirred by inert gas blowing as described below to sufficiently contact the molten metal and react with it to produce high refining effects.

The heating during re-refining in accordance with the invention is characterized in that it is inert gas plasma-heating.

Inert gas plasma-heating effectively heats a synthetic flux comprising CaO and $CaF_2$, CaO and $Al_2O_3$, or CaO, $CaF_2$ and $Al_2O_3$ as described above, while coating the surface of a molten metal and flux to prevent them from being oxidized, increasing the temperature of the molten metal or compensating a decrease in temperature, and avoiding the possibility of recontamination such as entering of carbon as in a graphite electrode arc heating method. This effect is suitable for melting stainless steel or Fe—Ni alloys that requires strict control of carbon. Of course, the invention may include refining up to a level higher than that of as in the embodiments described below.

According to the 11th to 14th features of the invention, it is important to adjust the content of carbon in molten metal of an Fe—Ni alloy specified by the invention to 0.01% or less during "RPR". To do this, an iron source with as small a content of carbon as possible should be selected as a material. For example, if the content of C is desired to be 0.01% or less, the iron source desirably contains 0.03% of C.

If a smaller value, for example, 0.005% is desired, the iron source desirably contains 0.015 to 0.02% of C. However, since an iron source with a low content of carbon is expensive, decarburization reaction with iron ore or an oxide such as NiO may be combined with "RPR" process. As a third means, stirring can be combined with a "RPR" process. Electromagnetic stirring or stirring with Ar gas can be adopted as a stirring method. A vacuum inductive furnace (VIF) is desirable as a furnace including these means, but the "RPR" in accordance with the invention can also be implemented using an AOD or a VOD furnace.

According to the 11th to 14th features of the invention, there is proposed a new method for refining an Fe—Ni alloy containing 30 to 50% of Ni and requiring the amount of carbon, sulfur, and nonmetal inclusions involved to be very small, and requires a combination of "RPR" under specific conditions for substantially reducing the load on plasma refining with plasma refining. The invention also includes a combination with primary refining for reducing the load on "RPR".

With the invention, carbon content is reduced to 0.01% or less during "RPR" or desirably reduced to 0.005% or less when there are rigid requirements such as the improvement of the etching capability of the Fe—Ni alloy. If this condition is met, the content of C can be maintained at 0.01% or desirably 0.005% during a subsequent plasma re-refining process so that carbon content in final products will be at least 0.01% or less. This saves the overall refining process most or much of the decarburization process, thereby reducing the overall refining time and enabling refining other than decarburization to be performed during plasma re-refining to allow an Fe—Ni alloy with a very small amount of impurities and C to be obtained.

Since the "RPR" in the refining method of the invention is carried out in a vessel having a heating means, the use of such a heating means as required prevents the temperature of the molten metal from decreasing to enable the molten metal to be flexibly refined at a predetermined level, thereby allowing various materials and required refining levels as well as a relatively small amount of molten metal to be dealt with. The use of an arc furnace as a melting and refining furnace before "RPR" as in the 11th and 12th inventions allows efficient melting and refining, and also enables oxygen blowing to be used together for the refining of an Fe—Ni alloy using an iron source with a particularly high carbon content. This reduces the load on a furnace of the "RPR". Melting and refining before "RPR" can be adopted for the first to tenth features of the invention. If refining starts with the melting of a cold material in a "RPR" furnace, a furnace of first refining can of course be omitted to allow quick decarburization under vacuum or reduced pressure as the eleventh and twelfth features of the invention.

In addition, a second or new vessel should be prepared in such a way that it is not be contaminated by splash or fume during the "RPR".

Figure 12:
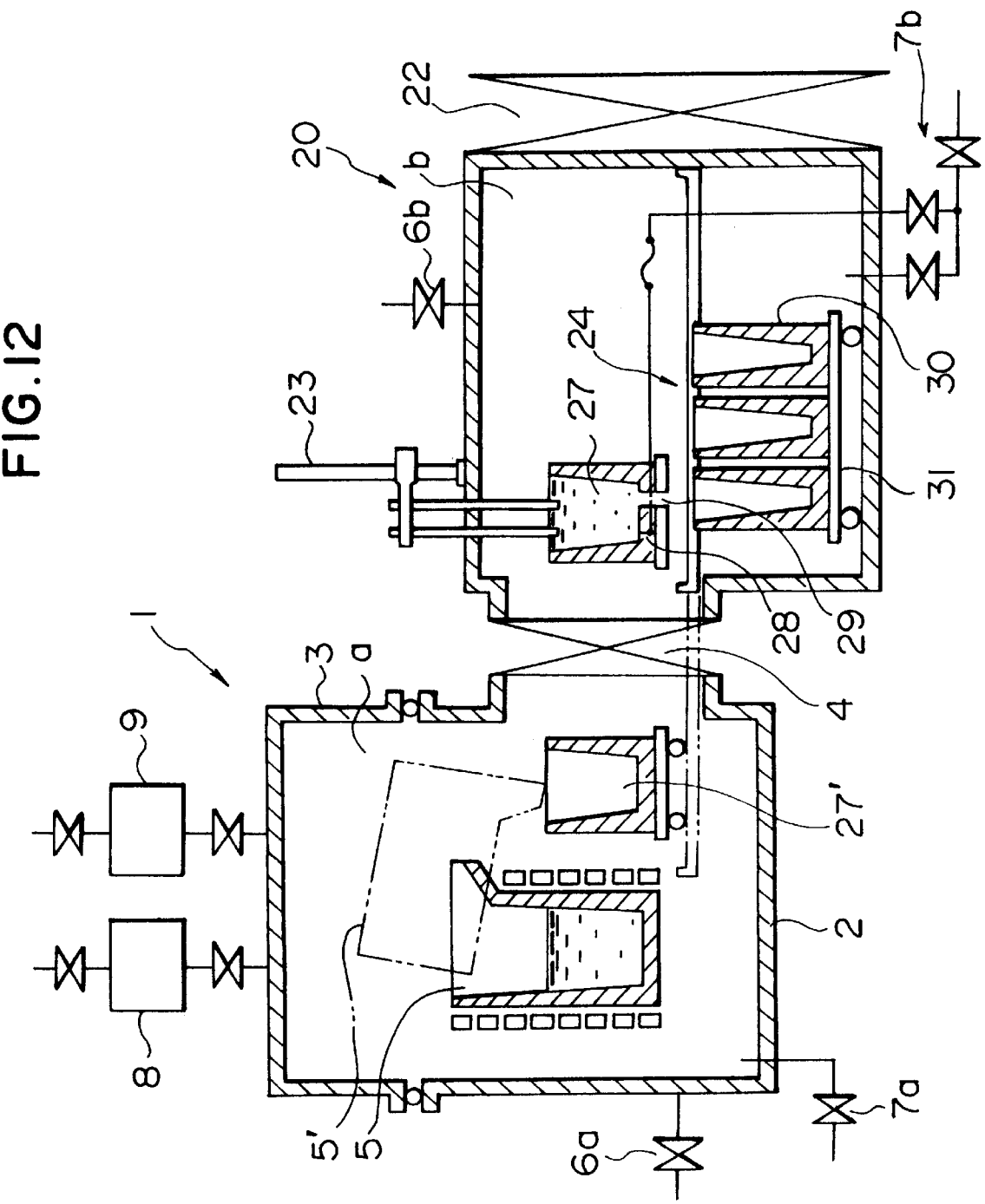
FIG. 12 is an apparatus still another embodiment of the invention.

An apparatus comprising a combination of "RPR" furnace of the "RPR" and a re-refining furnace which is suitable for the above operation is shown in FIG. 12. In FIG. 12, the second or new vessel is set in a second chamber sealed from atmosphere which is connected to a first chamber (a) sealed from atmosphere through partitioning valve 4.

That is, since the "RPR" is preformed in the sealed chamber (a) in a vacuum or a low oxygen partial pressure atmosphere, a refining vessel 27 is preheated and then placed in a second chamber sealed from atmosphere of a vacuum or reduced-pressure chamber to the sealed chamber (a) connected through the partitioning valve 4.

Once refining in the chamber (a) is completed, the partitioning valve 4 is opened and the re-refining vessel 27 is moved through the opening of the valve to a position 27' in the chamber (a) with utilization of a track and cart 24.

At this point, the chamber (a) communicates with the sealed chamber (b) wherein the re-refining vessel has been set. However, since both chambers have been in a vacuum or had their pressure reduced, they simply have the same pressure and maintain a vacuum or low oxygen partial pressure atmosphere. This prevents the second vessel from being contaminated with splash or fume because it is located outside the sealed chamber (a) during "RPR".

EXAMPLE 1

Operation was performed in the equipment shown in FIG. 12 using the following procedure.

A molten metal in an arc furnace is poured into an induction heating refining furnace 5, and a chamber (a) sealed from atmosphere is evacuated for deoxidization.

A preheated re-refining vessel 27 is simultaneously set outside the sealed chamber (a). In this case, since the "RPR" is performed in the sealed chamber (a) in a vacuum or a low oxygen partial pressure atmosphere, the re-refining container 27 is placed in a vacuum or reduced-pressure chamber linked via the partitioning valve 4 to the sealed chamber (a).

Once refining in the sealed chamber (a) is completed, the partitioning valve 4 is opened and the re-refining vessel 27 is moved through the opening of the valve to a position 27' in the sealed chamber (a) using a track and a cart 24.

At this point, the sealed chamber (a) communicates with the reduced-pressure chamber (b) (the second chamber sealed from atmosphere) wherein the re-refining container was set. However, since both chambers have been in a vacuum or had their pressure reduced, they simply have the same pressure and maintain a vacuum or low oxygen partial pressure atmosphere.

The induction-heating refining furnace 5 is tilted to pour the molten metal into the re-refining vessel 27. This pouring can also be performed by opening a cover 3, moving the overall refining furnace 5 to the re-refining position 27, and then start re-refining.

After pouring, a flux mainly comprising CaO and $CaF_2$, CaO and $Al_2O_3$, or CaO, $CaF_2$ and $Al_2O_3$ is added to the molten metal from a sub-material feeding system 9. An additional alloy material is added as required. Although, in this experiment, the sub-material feeding system 9 is installed at the re-refining position, a material may be fed within the sealed chamber (a). The re-refining vessel retaining the molten metal is moved to the re-refining position 27 quickly using a track and a cart 24, heated by an inert gas plasma-heating device to heat and melt the flux. A gas is blown through a porous plug 28 into the molten metal via an inert gas supply system 7b to stir the molten metal, thereby causing fresh active slag therein to absorb drossy or scummy floating substances or adhesions that has flown into the re-refining vessel 27 with the molten metal during tilt-pouring, or contaminants generated by the refractories of the vessel before they melt and diffuse within the molten metal. This produces the maximum re-refining effect.

After re-refining is finished and the molten metal is killed in a predetermined manner, the molten metal is fed into ingot cases 30 via a sliding nozzle 29 for casting.

Next, the effects of the method of the invention is described with reference to various examples of experiments. An Fe-42Ni alloy was used for the molten metal in all the experiments.

Figure 2:
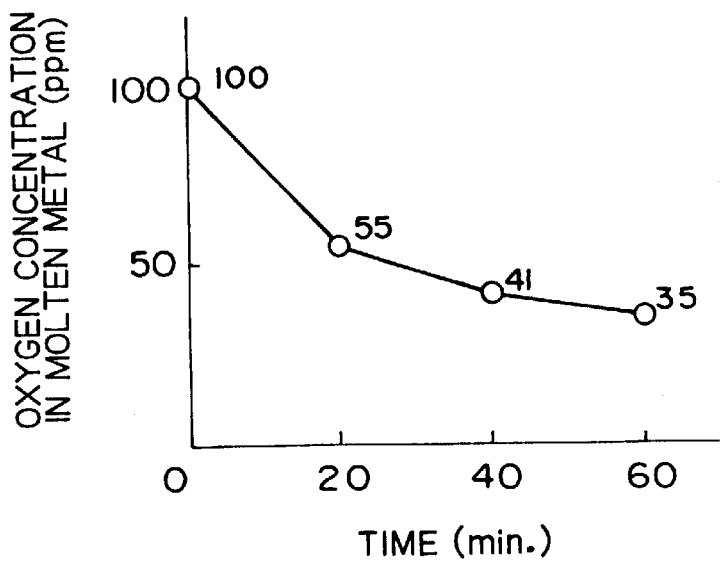
FIG. 2 shows the progress of refining vs. the elapsed time of refining using the concentration of oxygen in molten metal when a molten metal previously refined in an arc furnace is subjected to the "RPR" in a vacuum induction furnace.

FIG. 2 shows the results of measuring the progress of refining vs. elapsed time using the oxygen concentration of steel when cold materials are melted in an arc furnace and then poured into the vacuum induction-heating refining furnace 5, where the vacuum is increased and the "RPR" is carried out.

FIG. 2 shows that vacuum refining progresses quickly as time passes.

Figure 3:
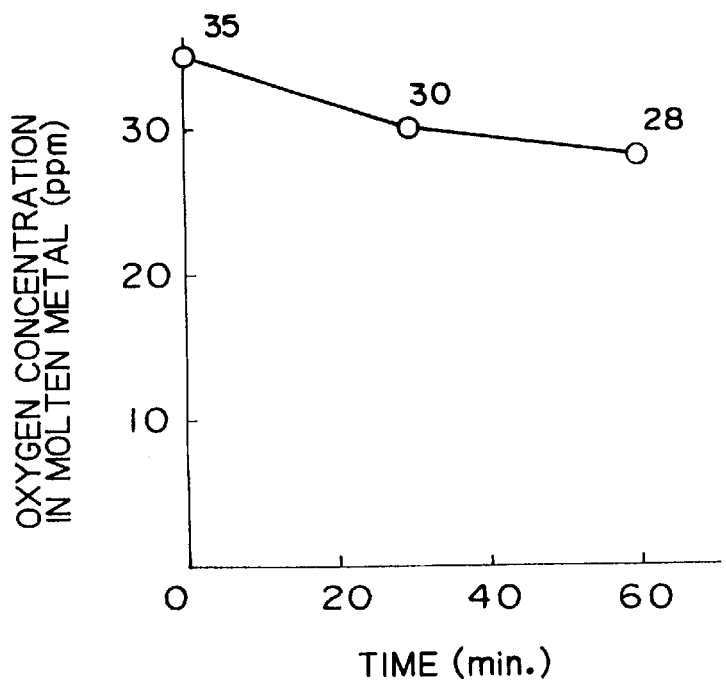
FIG. 3 shows the concentration of oxygen in the molten metal when a flux of CaO and $CaF_2$ in accordance with the invention is used to plasma-re-refine the molten metal after the "RPR" (FIG. 2)

FIG. 3 shows changes in gas concentration when the molten metal pre-refined under the same conditions as in the "RPR" stated above is tilt-poured under the same conditions as described above into a re-refining vessel the lining refractory of which is heated in an inert gas plasma-heating device in advance, where the re-refining in accordance with the invention is carried out by adding a flux of CaO and $CaF_2$ at a ratio of 1 to 1 for total 20 kg per ton of molten metal, stirring the molten metal using argon gas and the porous plug at the bottom wall of the vessel, and heating the molten metal by inert gas plasma from the surface of the molten metal. The basicity of slag collected after re-refining was 5. FIG. 3 shows that the re-refining in accordance with the invention prevents re-mixed matter from re-melting and that the concentration of gas gradually decreases as time passes and that the level of refining achieved in the re-refining under plasma-heating using this slag is higher than that of the "RPR".

Figure 4:
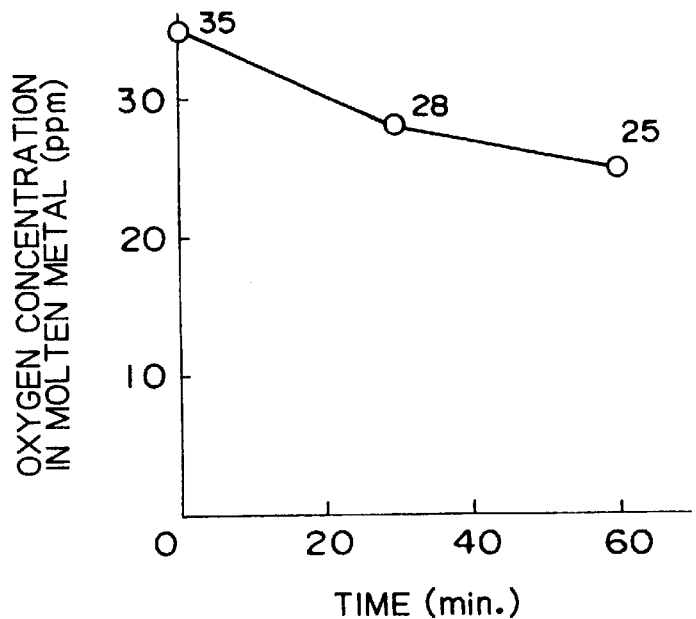
FIG. 4 shows the concentration of oxygen in melt when a flux of CaO and $Al_2O_3$ in accordance with the invention is used to plasma-re-refine the molten metal after the "RPR" (FIG. 2)
Figure 5:
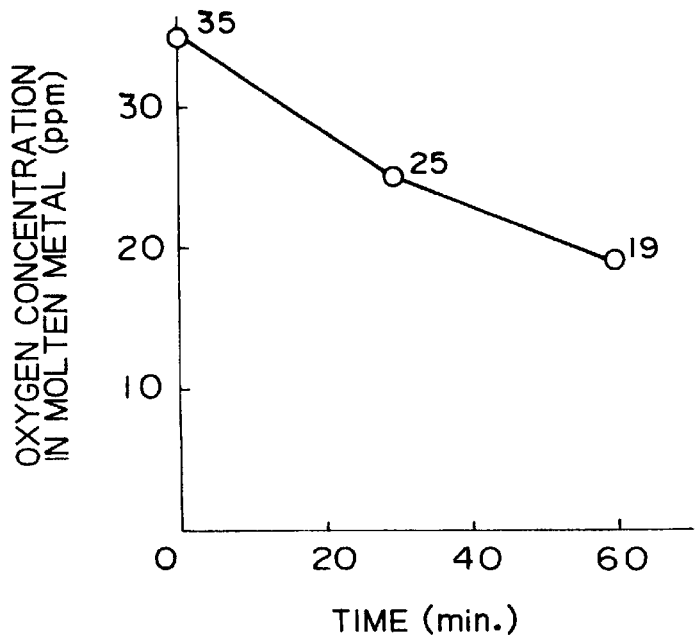
FIG. 5 shows the concentration of oxygen in melt when a flux of CaO, $CaF_2$ and $Al_2O_3$ in accordance with the invention is used to plasma-re-refine the molten metal after the "RPR" (FIG. 2)

FIG. 4 shows changes in gas concentration vs. the elapsed time of refining when a flux of CaO and $Al_2O_3$ at a ratio of 1 to 1 is added for total 20 kg per ton of the molten metal. FIG. 5 shows similar changes when a flux of CaO, $CaF_2$ and $Al_2O_3$ at a ratio of 2 to 1 to 1 is added for total 20 kg per ton of the molten metal. The basicity after re-refining was 4 in both FIGS. 4 and 5.

The figures show that addition of a combination of CaO, $CaF_2$ and $Al_2O_3$ produces the best deoxidization effect and promotes the floating and separation of inclusions well.

EXAMPLE 2

Figure 6:
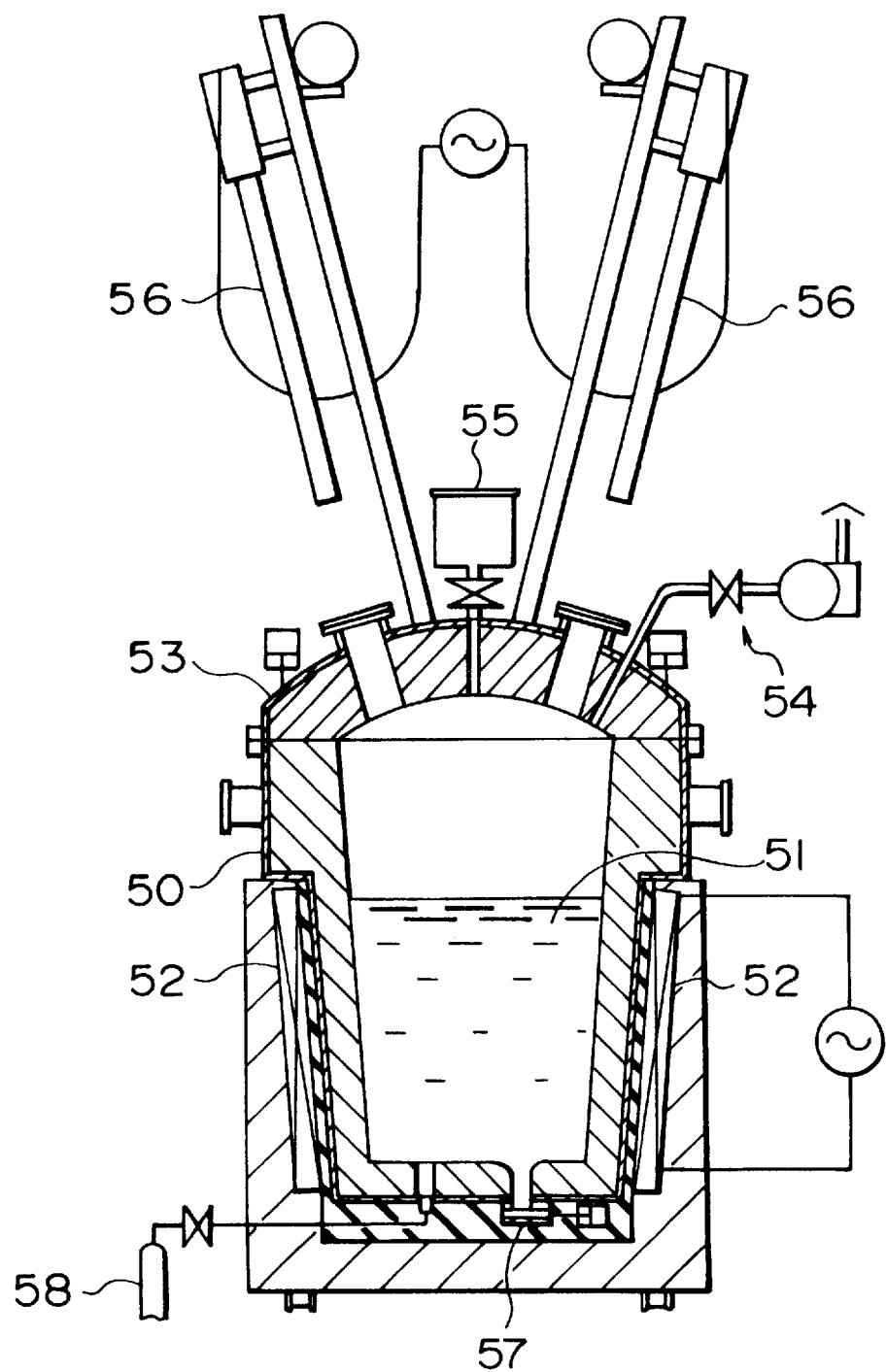
FIG. 6 illustrates an apparatus as another embodiment of the invention.

Operation was performed using the equipment shown in FIG. 6 and the following procedure.

A molten metal of the same Fe-42Ni alloy as in example 1 in an arc furnace was poured into a vessel 50. A vessel cover 53 for sealing was attached and an evacuation system 54 was subsequently used to reduce the pressure inside the vessel 50, and an induction-heating coil 52 was used to start melting. An lance (not shown) was inserted into the molten metal 51, and decarburization refining was performed by blowing a gas mixture of oxygen and Ar into the molten metal from outside via the lance. After the blowing of the mixed gas was finished, nickel oxide and ($Fe_2O_3$) were added from a feeder 55 for 3 kg per ton of the molten metal. The capacity of the evacuation system 54 was then increased to start deoxidization. Once the deoxidization refining was finished, the evacuation system 54 was stopped and argon gas was introduced from an argon bottom blowing stirrer 58 for substitution. A flux of CaO, $CaF_2$ and $Al_2O_3$ at a ratio of 2 to 1 to 1 was then added from the feeder 55 for total 20 kg per ton of the molten metal.

Re-refining was the carried out by inserting into a vessel 50 a plasma-heating torch 56 set outside the vessel cover 53 to start plasma-heating (FIG. 6 shows conditions before the insertion of the torch), and blowing argon gas into the molten metal from the argon bottom blowing stirrer 58 to stir the molten metal.

When re-refining was finished, the vessel 50 was lifted and moved to a casting station, where the sliding nozzle 57 was opened to pour the molten metal into an ingot case placed below the sliding nozzle for casting.

A gas analysis of samples collected from the ingot obtained in this manner demonstrated that the oxygen and carbon concentrations of the Fe-42Ni alloy processed using the above method were 24 ppm and 30 ppm, respectively, whereas the oxygen and carbon concentrations of the alloy decarburized and deoxidized by adding to it the mixed gas used in embodiment 1 and nickel oxide and then re-refining it in a plasma-heating furnace were 21 ppm and 29 ppm, respectively.

Although the above example has been described in conjunction with the use of a vacuum refining method for the refining under a reduced pressure, the invention is not limited to this aspect. An inert gas atmosphere with an absolute pressure of about 200 Torr or less is usually selected as appropriate depending on alloy component elements contained in the molten metal to be refined in order to prevent the loss of those components due to vaporization; that is, the invention is applicable to cases in which vacuum is not high.

In addition, although the above example uses for vacuum refining, molten metal already melted and refined in another melting furnace, the invention is not limited to this aspect, and can start with a solid raw material followed by melting and the refining under a reduced pressure.

Advantageously, according to the molten metal refining method of the invention the "RPR" can be started to process the molten metal substantially without slag. Consequently, only a small amount of flux need to be added during re-refining due to the lack of the need to improve slag, which may otherwise be contained in the molten metal, and the flux is sufficiently heated by inert gas plasma-heating so as to have low viscosity and to be active, thereby allowing effective and efficient re-refining.

The re-refining in accordance with the invention prevents re-mixed matter from re-melting, and the level of refining under plasm heating achieved using this flux is higher than that of the "RPR".

In particular, addition of CaO, $CaF_2$ and $Al_2O_3$ results in higher deoxidization efficiency and sufficiently promotes the floating and separation of inclusions.

Due to the lack of entering of carbon during re-refining, the invention is effective when it is applied to an alloy for which carbon mixing is particularly strictly limited.

This allows the molten metal to be well refined at high liberty and thus sound ingots and cast products to be obtained regardless of kinds of material, required refining level, or capacity of the furnace.

EXAMPLE 3

Operation was performed using the equipment shown in FIG. 1 and the following procedure.

After cold materials were fed into the induction-heating refining furnace 5, the cover 3 was attached, the evacuation system 6a was used to reduce the pressure inside the chamber (a) sealed from atmosphere, and melting was started in the induction-heating furnace. An lance (not shown) was then inserted into the molten metal, and a gas mixture of oxygen and Ar was blown into the molten metal from the outside of the sealed chamber (a) through the lance. After the blowing of the mixed gas was finished, the lance was raised from the molten metal and the supply of the gas was stopped. Vacuum refining was subsequently executed in the sealed chamber with its vacuum increased to 1 Torr or more.

By this time, a preheated re-refining vessel with the vessel cover 27a attached had been set inside the sealed chamber. This is to prevent splash during the "RPR". When refining in the sealed chamber (a) was completed, the induction-heating refining furnace 5 was tilted to pour the molten metal into the re-refining vessel 27'. The partitioning valve 4 was then opened, and the re-refining vessel 27' was moved through the opening of the valve to the re-refining position 27 using the track and cart 24.

A flux was subsequently added from the sub-material feeding system 9 and then heated and melted by the inert gas plasma-heating device. Re-refining was carried out by blowing Ar gas from the porous plug 28 into the molten metal through an inert gas introduction system 7 to stir the molten metal.

After re-refining was finished and the molten metal was killed in a predetermined manner, the molten metal was poured into the ingot case 30 through the sliding nozzle 29. Although, in this example, the re-refining vessel 27' was set in the sealed chamber (a) in advance, the equipment shown in FIG. 12 may be used. In this case, the re-refining vessel can be sufficiently preheated and contamination due to splash can be prevented.

Next, the effects of the method of the invention are described with reference to various experiments. An Fe-42Ni alloy was used as the molten metal in all the experiments.

Figure 7:
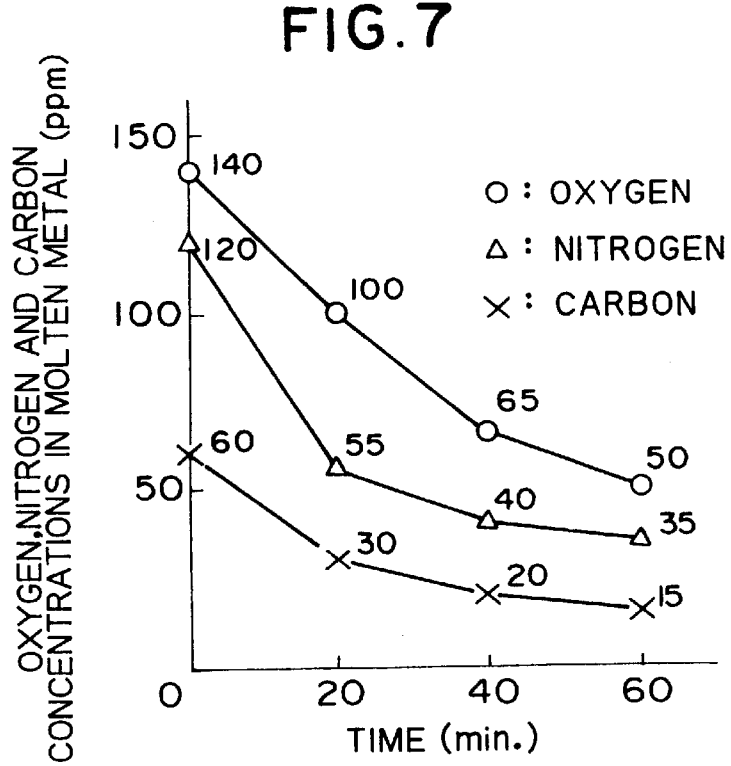
FIG. 7 shows the results of measuring the progress of the "RPR" vs. the elapsed time of refining using the oxygen, the nitrogen and the carbon concentrations of a molten metal when a solid material is fed into a vacuum induction heating refining furnace and melted therein and once melted, evacuation is continued without addition or blowing of an oxygen source.

FIG. 7 shows the progress of the "RPR" vs. elapsed time using the oxygen, the nitrogen, and the carbon concentrations of molten metal when a solid raw material is fed into an vacuum induction-heating refining furnace, melting is then started, and once melting of the material is finished, evacuation is continued without addition or blowing of an oxygen source.

FIG. 7 shows that vacuum refining reduces the oxygen and the nitrogen concentrations of the molten metal quickly, when oxygen is combined with carbon to generate CO gas, which is then discharged out of the sealed chamber (a), resulting in a simultaneous decrease in carbon value.

Figure 8:
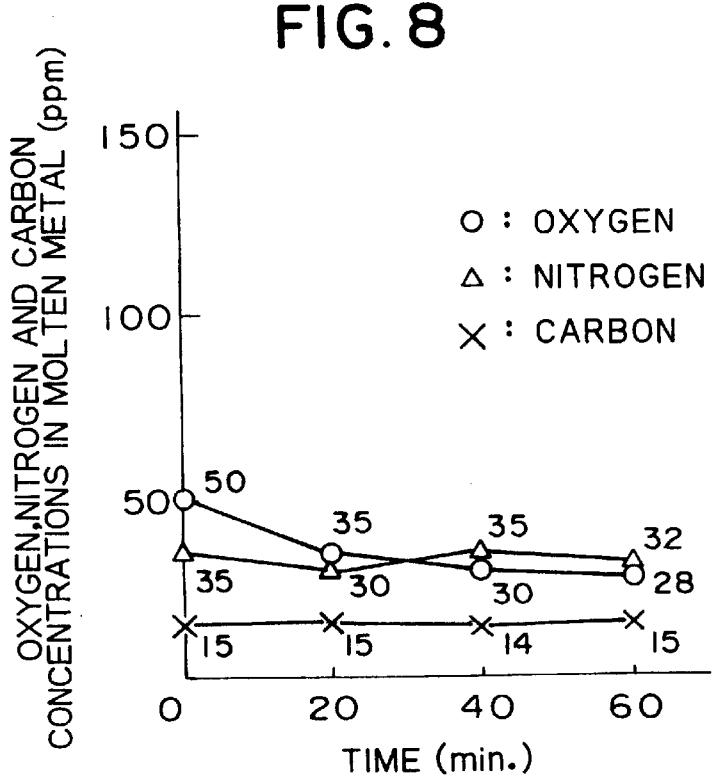
FIG. 8 shows elapsed time and changes in oxygen, nitrogen, and carbon concentrations since a molten metal is poured into another vessel for re-refining after "RPR" (FIG. 7), a new flux is added into the molten metal and re-refining by plasma-heating is started.

FIG. 8 shows changes in oxygen, nitrogen, and carbon concentrations when re-refining is carried out in accordance with the invention by tilt-pouring molten metal refined under the same conditions as in the above the "RPR" into the re-refining vessel the lining refractory of which is heated by the inert gas plasma-heating device, adding a flux to the molten metal, stirring the molten metal using argon gas and the porous plug at the bottom wall of the furnace, and heating the surface of the molten metal by inert gas plasma. This figure demonstrates that the re-refining in accordance with the invention prevents re-mixed matter from re-melting and that the oxygen concentration gradually decreases as time passes while the nitrogen concentration remains almost unchanged.

In addition, the carbon concentration was approximately similar to the level after the "RPR", and re-refining was not be able to further decarburize the molten metal. Thus, adjustment during the "RPR" is important to obtain molten metal with a nitrogen content of 0.01% or less, which is the primary object of the invention. Once nitrogen has been reduced to such a level, effective refining can be executed by newly adding only a few types and a small amount of fluxes during subsequent re-refining by plasma-heating that is an important process.

Then, as in the above process, cold materials were melted in the induction-heating furnace 5, and once melting of the material was finished, a lance was inserted into the molten metal. The "RPR" was then executed by blowing a gas mixture of oxygen and Ar from the lance into the molten metal, adding nickel oxide for 3 kg per ton of the molten-metal, and increasing the vacuum. When the "RPR" was finished, the molten metal was sampled and analyzed to find that the oxygen, nitrogen, and carbon concentrations were 67 ppm, 30 ppm, and 11 ppm, respectively. The molten metal was then transferred into the plasma refining furnace, and a flux was added to the molten metal. Re-refining and then casting were performed. Analysis of the ingot obtained showed that the oxygen, nitrogen, and carbon concentrations were 22 ppm, 29 ppm, and 12 ppm. Thus, re-refining by plasma-heating can sufficiently deoxidize the molten metal with a very small increase in nitrogen and carbon concentrations to remove impurities and nonmetallic inclusions.

As described above, to provide an alloy with a low nitrogen content for which a low carbon content is particularly required, the alloy can be sufficiently decarburized in a furnace of the "RPR" and then vacuum-refined to obtain clean molten metal, which is then re-refined by plasma-heating to obtain an alloy with very high purity.

Although the above embodiment has been described in conjunction with the use of a vacuum refining method for the "RPR", the invention is not limited to this aspect. An inert gas atmosphere with an absolute pressure of about 200 Torr or less is usually selected as appropriate depending on alloy component elements contained in the molten metal to be refined in order to prevent the loss of those components due to vaporization; that is, the invention is applicable to cases in which vacuum is not high.

Although the above example has been described in conjunction with the direct melting of a solid raw material in a furnace of the "RPR", processes before vacuum refining, that is, melting and blowing or addition of an oxygen source may of course be carried out in another vessel.

EXAMPLE 4

Operation was performed using the equipment shown in FIG. 6 and the following procedure.

After a molten metal of JIS SKH57 melted in an arc furnace that is high carbon, high V (vanadium) and highspeed tool steel was poured into the vessel 50, the vessel cover 53 was attached and the evacuation system 54 was used to evacuate the inside of the vessel 50. The "RPR" was then performed using the induction heating coil 52. When the deoxidization refining was finished, the evacuation system 54 was stopped and the molten metal was analyzed for the amounts of its components. It was then found that the oxygen and the nitrogen concentrations were 59 ppm and 39 ppm, respectively. The carbon amount, which had been excessively removed due to decarburization during the deoxidization process, was adjusted to the target value of 1.25% by adding a carbon source, after the "RPR" was finished. Argon gas was subsequently blown from the argon gas bottom blowing stirrer 58 into the molten metal for substitution, and a flux was added to the molten metal from the feeder 55. Re-refining was then performed by inserting the plasma-heating torch 56 set outside the vessel cover 53 into the vessel 50 to start plasma-heating, while blowing argon gas from the argon bottom blowing stirrer 58 into the molten metal to stir. When re-refining was finished, the sliding nozzle 57 was opened to pour the molten metal into the ingot case located below the sliding nozzle.

Analysis of samples collected from the ingot obtained showed that the oxygen, the nitrogen, and the carbon concentrations were 35 ppm, 37 ppm and 1.26%, respectively.

The molten metal refining method of the invention is suitable for steel and alloys for which the content of nitrogen as impurities is particularly strictly limited, and is advantageously applicable to those such as Ni-base super alloys which low carbon level is required, electric and magnetic Fe—Ni system alloys for, or high-carbon and high-alloy tool steels.

According to the invention, clean molten metal with its nitrogen content reduced during the "RPR" and substantially containing no slag can be introduced into subsequent plasma-heating refining to obtain an alloy very effectively refined and having very high purity.

With the invention, a relatively small amount of slag is generated during the "RPR", the nitrogen level of melt is low, and the molten metal with only a small amount of oxygen remaining therein can be obtained. As a result, addition of only a few types and a small amount of fluxes to molten metal can make re-refining by plasma-heating more effective.

The decarburization by the blowing of a gas mainly comprising oxygen gas during the "RPR" in accordance with the invention simultaneously promotes denitrification in a balanced reaction.

The invention also allows very clean molten metal to be efficiently re-refined by plasma-heating by transferring the molten metal after the "RPR" into a different vessel for deoxidization and denitrification.

EXAMPLE 5

Operation was performed using the equipment shown in FIG. 1 and the following procedure.

Cold materials comprising a scrap of an Fe—Ni alloy, an iron source, and an Ni source was melted in the induction-heating refining furnace 5.

The target composition was an Fe-42Ni alloy containing 0.008% or less of carbon and 0.005% or less of sulfur. The iron source contained 0.034% of carbon, and NiO (nickel oxide) and iron ore were used for 12 kg/ton as a solid raw material used both as an alloy material and for decarburization. The evacuation system 6a was used to evacuate the inside of the sealed chamber (a), and the "RPR" was performed by adding NiO to molten metal to adjust the composition of the alloy while repeating decarburization and deoxidization.

Although this example starts with cold materials in a furnace of the "RPR", the cold materials may be melted in another vessel and then transferred into the furnace 5 of the "RPR" shown in FIG. 1 via a ladle the cover 3 opened.

The preheated re-refining vessel with the vessel cover 27a attached had been set inside the sealed chamber (a) in advance. This is to prevent splash during the "RPR". Although, in this example, the re-refining vessel 27' is set in the sealed chamber (a) in advance, the re-refining vessel 27' can be externally prepared by installing a different chamber sealed from atmosphere (not shown but referred to (b)) in communication with the partitioning valve 4. In this case, plasma-heating can be used to sufficiently preheat the re-refining vessel at the re-refining position 27. The pressure of the sealed chamber (b) in communication with the chamber (a) is reduced so as to be similar to that of the chamber (a) immediately before the "RPR" is finished. The partitioning valve 4 is then opened and the re-refining vessel 27' is moved from position 27 to position 27'. After the "RPR" is finished, the molten metal is discharged and the vessel is moved back to the position 27.

This method is characterized in that it can prevent splash from sticking to the re-refining vessel and that it can provide sufficient preheating and that it can produce the effect of plasma refining quickly. After refining in the sealed chamber (a) is completed, the induction-heating refining furnace 5 is tilted to pour the molten metal into the re-refining vessel 27'. The partitioning valve 4 is opened, and the re-refining vessel 27' is transferred to the re-refining position 27 through the opening of the valve using the track and cart 24.

A flux is subsequently added from the sub-material feeding system 9, and re-refining is performed by heating and melting the flux by the inert gas plasma heater and blowing an Ar gas from the porous plug 28 into the molten metal via the inert gas introduction system 7b to stir the molten metal.

After re-refining is finished and the molten metal melt is killed in a predetermined manner, the molten metal is poured into the ingot case 30 via the sliding nozzle 29.

Next, the effects of the method of the invention are described with reference to various experiments. An Fe-42Ni alloy was used as the molten metal in all the experiments.

Figure 9:
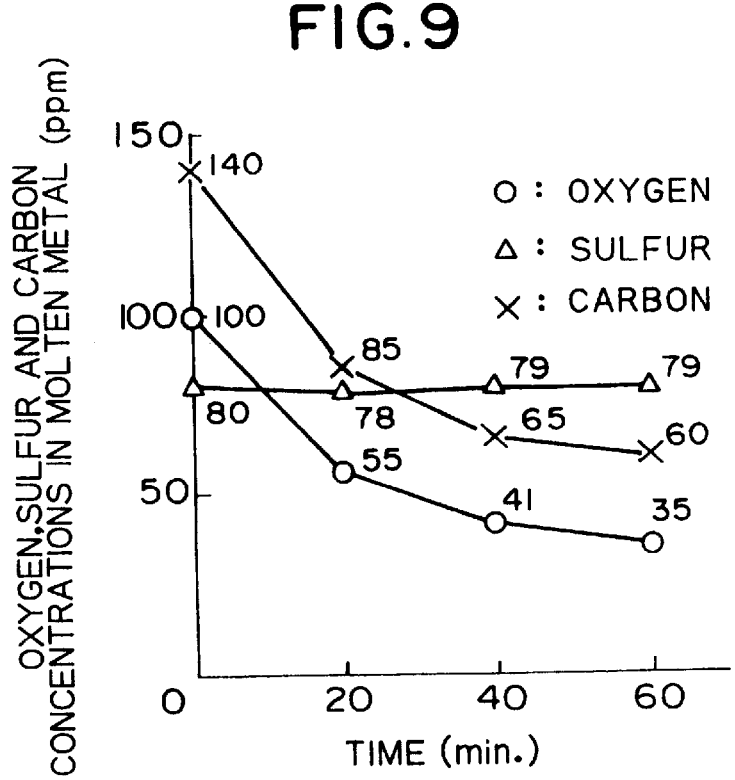
FIG. 9 shows the results of measuring the progress of "RPR" vs. the elapsed time of refining using the oxygen, the carbon, and the sulfur concentrations of molten metal when molten metal already refined in an arc furnace is subjected to the "RPR" in an vacuum inductive furnace.

FIG. 9 shows the results of measuring the progress of refining vs. elapsed time using the oxygen, the carbon, and the sulfur concentrations of molten metal when the alloy is melt and poured into a vacuum induction heating refining furnace without primary decarburization, and the furnace is subsequently evacuated, where the "RPR" is executed.

FIG. 9 shows that, in vacuum refining, as time passes, oxygen in molten metal, when vaporizing, reacts with carbon to generate CO gas, which is then discharged out of the furnace, thereby causing rapid progress of deoxidization and decarburization while restraining the progress of desulfurization.

Figure 10:
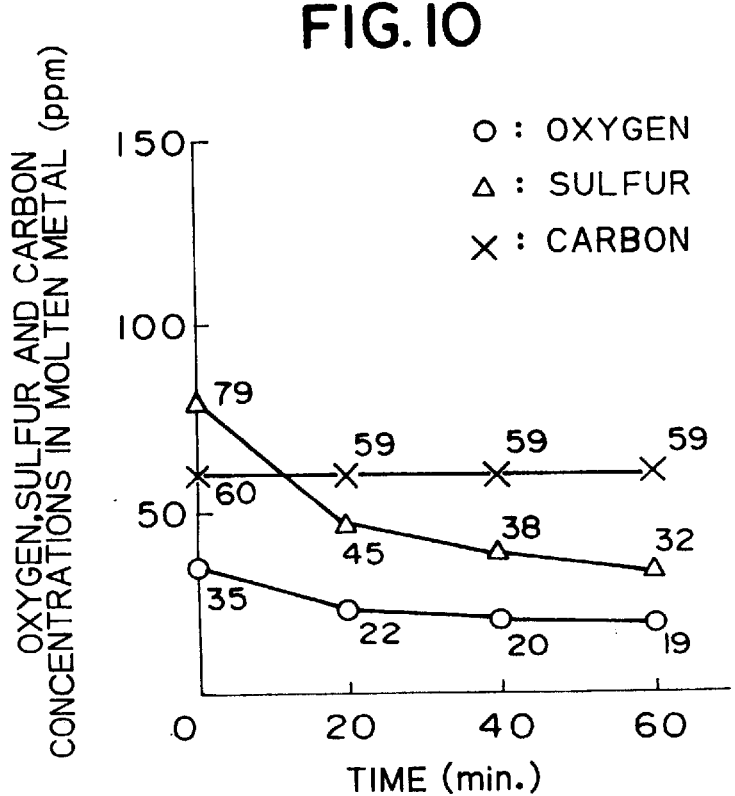
FIG. 10 shows elapsed time and changes in oxygen, carbon, and sulfur concentrations of molten metal when a flux of CaO, $CaF_2$ and $Al_2O_3$ in accordance with the invention is used to plasma-re-refine the molten metal after the "RPR" (FIG. 9)

FIG. 10 shows changes in oxygen, sulfur, and carbon concentrations when molten metal of an Fe—Ni alloy formed in the arc furnace and refined in the vacuum inductive furnace (VIF) is poured into another vessel and then tilt-poured under the same conditions as described above into the re-refining vessel the lining refractory of which has been heated by the gas plasma heater in advance, and re-refining in accordance with the invention is carried out by adding a flux to the molten metal, stirring the melt using argon gas and the porous plug at the bottom of the furnace, and heating the surface of the molten metal by gas plasma. The flux added during re-refining comprised CaO, $CaF_2$, and $Al_2O_3$ at a ratio of 2 to 1 to 1 added to molten metal for total 20 kg per ton of the molten metal. FIG. 10 shows that the re-refining in accordance with the invention prevents re-mixed matter from re-melting and that desulfurization progresses as time passes with the oxygen concentration gradually decreasing.

Evaluation of nonmetal inclusions in the alloy obtained by this refining using JIS method showed that $d_{60 \times 400}=0.004\%$, whereas $d_{60 \times 400}=0.025\%$ for the re-refining in the ASEA-SKF furnace shown below, indicating that this method produces a good effect of reducing nonmetallic inclusions.

Figure 11:
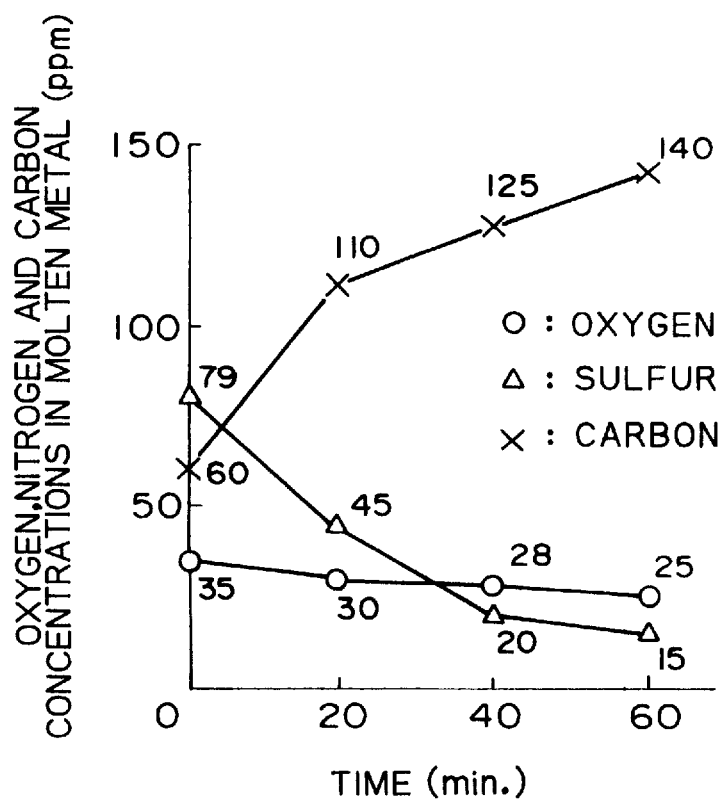
FIG. 11 shows elapsed time vs. changes in oxygen, carbon, and sulfur concentrations of an Fe-42Ni alloy when the molten metal is re-refined in the ASEA-SKF furnace after vacuum refining in accordance with the prior art.

On the other hand, FIG. 11 shows changes in the oxygen, the sulfur, and the carbon concentrations vs. elapsed time when the molten metal after the "RPR" with utilization of an arc furnace and a vacuum inductive furnace (VIF) similar to those in the above embodiment is poured into ASEA-SKF furnace that is a conventional refining means, where re-refining is performed.

FIG. 11 show that although refining using the conventional ASEA-SKF furnace is effective for deoxidization and desulfurization, it is not suitable for an Fe-42Ni alloy for which the mixing of carbon is strictly limited and the invention is intended because the carbon value increases rapidly due to entering of carbon caused by graphite constituting the heating electrode.

EXAMPLE 6

Operation was performed using the equipment shown in FIG. 6 and the following procedure.

After the same cold materials as in embodiment 1 was fed into the "vessel" 50, the vessel vacuum cover 53 was attached, the evacuation system 54 was used to reduce the pressure inside the vessel 50, and the induction-heating coil 52 was used to start melting. Decarburization refining was then carried out by inserting a lance (not shown) into the molten metal 51, and blowing a gas mixture of oxygen and Ar into the molten metal from the outside of the vessel. After the blowing of the mixed gas was finished, nickel oxide and iron oxide ($Fe_2O_3$) were subsequently fed from the feeder 55 for 3 kg per ton of the molten metal. Deoxidization refining was then executed with the capacity of the evacuation system 54 increased. Samples of the molten metal collected when deoxidization refining was finished had oxygen concentration of 66 ppm, carbon concentration of 27 ppm, and sulfur concentration of 83 ppm. The evacuation system 54 was subsequently stopped, and argon gas was blown from the argon bottom blowing stirrer 58 into the molten metal for substitution.

A flux comprising CaO and $CaF_2$ at a ratio of 1 to 1 was subsequently added to the molten metal from the feeder 55 for total 20 kg per ton of the molten metal. Re-refining was then performed by inserting the plasma-heating torch 56 set outside the vessel cover 53 into the vessel 50 to start plasma-heating, while blowing an argon gas from the argon bottom blowing stirrer 58 into the molten metal to stir. When re-refining was finished, the sliding nozzle 57 was opened to pour the molten metal into the ingot case located below the sliding nozzle.

Analysis of samples collected from the ingot obtained in this manner showed that the oxygen, the carbon, and the sulfur concentrations of the alloy obtained by the above method were 31 ppm, 27 ppm, and 32 ppm, respectively, while the similar values of the alloy decarburized and deoxidized by vacuum refining and then re-refined in the plasma-heating furnace were 36 ppm, 54 ppm, and 65 ppm, respectively.

Although the above example has been described in conjunction with the use of a vacuum refining method for the "RPR", the invention is not limited to this aspect. An inert gas atmosphere with an absolute pressure of about 200 Torr or less is usually selected as appropriate depending on alloy component elements contained in the molten metal to be refined in order to prevent the loss of those components due to vaporization; that is, the invention is applicable to cases in which vacuum is not high.

After an Fe-42Ni alloy was melted, decarburized, and subjected to the "RPR" by vacuum processing using the equipment shown in FIG. 6 and the same procedure as in the above example 6, re-refining by plasma-heating was carried out by adding a flux comprising CaO and $Al_2O_3$ at a ratio of 1 to 2 for total 5 kg per ton of the molten metal. Analysis of samples collected from the ingot obtained showed that the oxygen, the carbon, and the sulfur concentrations were 49 ppm, 31 ppm, and 51 ppm.

Since the refining method of the invention for Fe—Ni alloys containing 30 to 50% of Ni reduces carbon to 0.01% or less in a furnace of the "RPR" in advance and does not add a flux to molten metal during the "RPR", relatively clean molten metal substantially containing no slag and having a low carbon level, that is, a much smaller amount of impurities can be advantageously used for re-refining. Only a small amount of flux need be added during re-refining due to the lack of the need to improve slag, which may otherwise be contained in molten metal, and the flux is sufficiently heated by inert gas plasma-heating so as to have low viscosity and to be active, thereby allowing re-refining that effectively and efficiently desulfurizes molten metal and removes impurities such as scum therefrom.

The refining method of the invention allows molten metal refining that can unristrictedly deals with high level refining without causing the pickup of carbon described above or the need to improve slag, which may otherwise be contained in molten metal, in refining Fe—Ni alloys containing at least 30 to 50 wt. % Ni for which the contents of carbon and sulfur as well as nonmetallic inclusions in products are strictly limited.

Addition of the first refining as a prestage for the "RPR" allows more efficient refining.

I claim:

1. A method of refining molten metal, which method comprises the steps of refining a molten metal by reduced-pressure-refining (RPR) under vacuum or a low oxygen partial pressure atmosphere in a vessel provided with heating means, adding a flux mainly comprising any combination of CaO and $CaF_2$, CaO and $Al_2O_3$, or CaO, $CaF_2$ and $Al_2O_3$ into the refined molten metal substantially, without slag, and subsequently heating the molten metal by means of inert gas plasma to re-refine the refined molten metal.

2. A method of refining molten metal according to claim 1, wherein the re-refining is carried out in a second vessel which differs from a first vessel in which the reduced-pressure-refining is carried out.

3. A method of refining molten metal, which method comprises refining a molten metal in a vessel having heating means under a reduced pressure of vacuum or a low oxygen partial pressure atmosphere to reduce its nitrogen content to 0.01% or less, adding a flux into the refined molten metal substantially without slag, and subsequently heating the molten metal by means of inert gas plasma to re-refine the refined molten metal.

4. A method of refining molten metal according to claim 3, wherein the re-refining is carried out in a second vessel which differs from a first vessel in which the reduced-pressure-refining is carried out.

5. A method of refining molten metal, wherein oxygen or a mixture of oxygen and an insert gas is added or blown into a previously molten metal to reduce its carbon content to 0.01% or less, the processed molten metal is transferred to a vessel having heating means and subjected to reduced-pressure-refining, a flux is added into the molten metal after the reduced-pressure-refining and subsequently the molten metal and flux is heated by means of inert gas plasma to re-refine the metal to reduce its carbon content to 0.01% or less.

6. A method of refining molten metal according to claim 5, wherein the re-refining is carried out in a different vessel distinguished from a previous vessel in which the reduced-pressure-refining is carried out.

7. A method of refining molten metal, wherein oxygen or a mixture of oxygen and an inert gas is added or blown into a molten metal in vessel having heating means to adjust carbon content of the metal to 0.01% or less, the processed molten metal is subjected to reduced-pressure-refining, a flux is added into the molten metal after the reduced-pressure-refining, and subsequently the molten metal is heated by means of inert gas plasma to re-refine the metal to reduce its carbon content to 0.01% or less.

8. A method of refining molten metal according to claim 7, wherein the re-refining is carried out in a second vessel which differs from a first vessel in which the reduced-pressure-refining is carried out.

9. A method of refining molten metal, wherein a flux mainly comprising any combination of CaO and $CaF_2$, CaO and $Al_2O_3$, or CaO, $CaF_2$ and $Al_2O_3$ is added into a molten metal which has been previously subjected to a reduced-pressure-refining in a vessel having heating means, and subsequently the molten metal is heated by means of inert gas plasma to re-refine the molten metal to reduce its sulfur content to 0.005% or less.

10. A method of refining molten metal according to claim 9, wherein the re-refining is carried out in a second vessel which differs from a first vessel in which the reduced-pressure-refining is carried out.

11. A method of refining molten metal, wherein a previously melted Fe—Ni system alloy comprising 30 to 50 wt % Ni is poured into a vessel having heating means, the molten metal is subjected to a reduced-pressure-refining to reduce its carbon content to 0.01% or less, a flux mainly comprising any combination of CaO and $CaF_2$, CaO and $Al_2O_3$, or CaO, $CaF_2$ and $Al_2O_3$ is added into the refined molten metal, and subsequently the resultant refined molten metal is heated by means of inert gas plasma to re-refine the metal to reduce its carbon and sulfur contents to 0.01% or less and 0.005% or less, respectively.

12. A method of refining molten metal according to claim 11, wherein the re-refining is carried out in a second vessel which differs from a first in which the reduced-pressure-refining is carried out.

13. A method of refining molten metal, wherein a previously melted Fe—Ni system alloy comprising 30 to 50 wt % Ni is melted from a starting cold material in a vessel having heating means under vacuum or a low oxygen partial pressure atmosphere and subjected to reduced pressure refining, a flux mainly comprising any combination of CaO and $CaF_2$, CaO and $Al_2O_3$, or CaO, $CaF_2$ and $Al_2O_3$ is added into the refined molten metal, and subsequently the refined molten metal is heated by means of inert gas plasma to re-refine it to reduce its carbon and sulfur contents to 0.01% or less and 0.005% or less, respectively.

14. A method of refining molten metal according to claim 13, wherein the re-refining is carried out in a second vessel which differs from a first vessel in which the reduced-pressure-refining is carried out.

15. A method of refining molten metal according to any one of claims 1 to 14, wherein the heating means is of induction heating.

* * * * *

UNITED STATES PATENT AND TRADEMARK OFFICE
CERTIFICATE OF CORRECTION

PATENT NO.: 5,851,262

DATED: December 22, 1998

INVENTOR(S): Takashi MUKAI.

It is certified that an error appears in the above-identified patent and that said Letters Patent is hereby corrected as shown below:

Claim 5, col. 21, line 8, delete "insert" and substitute therefor --inert--.

Signed and Sealed this

Eighteenth Day of May, 1999

*Attest:*

Q. TODD DICKINSON

*Attesting Officer*  Acting Commissioner of Patents and Trademarks